(12) United States Patent
Sharma et al.

(10) Patent No.: US 10,499,287 B1
(45) Date of Patent: Dec. 3, 2019

(54) SYSTEM, METHOD, AND COMPUTER PROGRAM FOR SMART INTER-RADIO ACCESS TECHNOLOGY (IRAT) VOICE OVER LONG TERM EVOLUTION (LTE) MOBILITY

(71) Applicant: Amdocs Development Limited, Limassol (CY)

(72) Inventors: Ram Kumar Sharma, Rajasthan (IN); Krishnan Venkataraghavan, Chennai (IN); Sagar Tayal, Ambala (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/006,697

(22) Filed: Jun. 12, 2018

(51) Int. Cl.
  *H04W 36/00* (2009.01)
  *H04W 36/22* (2009.01)
  *H04W 36/30* (2009.01)

(52) U.S. Cl.
  CPC ... *H04W 36/0016* (2013.01); *H04W 36/0044* (2013.01); *H04W 36/22* (2013.01); *H04W 36/30* (2013.01)

(58) Field of Classification Search
  CPC ............................................. H04W 4/00–025
  See application file for complete search history.

(56) References Cited

U.S. PATENT DOCUMENTS

| | | | |
|---|---|---|---|
| 9,253,704 B1* | 2/2016 | Sarkar | H04W 36/30 |
| 2003/0005258 A1 | 1/2003 | Modha et al. | |
| 2008/0102834 A1* | 5/2008 | Bernhard | H04W 36/0085 455/436 |
| 2011/0176511 A1* | 7/2011 | Sayeedi | H04W 36/0016 370/331 |

(Continued)

FOREIGN PATENT DOCUMENTS

CN    106022385 A    10/2016

OTHER PUBLICATIONS

Kaoungku et al., "A Method to Clustering the Feature Ranking on Data Classification Using an Ensemble Feature Selection," International Journal of Future Computer and Communication, vol. 6, No. 3, Sep. 2017, pp. 81-85.

(Continued)

*Primary Examiner* — San Htun
(74) *Attorney, Agent, or Firm* — Zilka-Kotab, P.C.

(57) ABSTRACT

A system, method, and computer program product are provided for smart inter-Radio Access Technology (IRAT) Voice over Long-Term Evolution (VoLTE) mobility. In operation, a serving cell receives an indication of poor coverage from user equipment (UE) during an active call. The serving cell determines to initiate an inter-Radio Access Technology (IRAT) handover process if the coverage for the UE has become worse than a threshold value. The serving cell identifies at least one parameter (e.g. CovTriggerdBlind-HoAllowed) indicating a conditional state in which selection between a measurement-based handover and a blind-based handover for the IRAT handover process is based on a critical condition threshold. The serving cell selects between the measurement-based handover and the blind-based handover for the IRAT handover process, as a result of identifying the conditional state of the parameter.

7 Claims, 15 Drawing Sheets

(56) References Cited

U.S. PATENT DOCUMENTS

2011/0263255 A1* 10/2011 Alonso-Rubio ............................
H04W 36/0005
455/436
2017/0094574 A1* 3/2017 Singh ................ H04W 36/0022

OTHER PUBLICATIONS

Sarvari et al., "Harmony Search Algorithm for SimultaneousClustering and Feature Selection," International Conference of Soft Computing and Pattern Recognition, IEEE, 2010, pp. 202-207.
Dimitriadou et al., "Voting-Merging: An Ensemble Method for Clustering," ICANN, 2001, pp. 217-224.
Strehl et al., "Cluster Ensembles—A Knowledge Reuse Framework for Combining Multiple Partitions," Journal of Machine Learning Research, vol. 3, 2002, pp. 583-617.
Dutta et al., "Simultaneous Continuous Feature Selection and K Clustering by Multi Objective Genetic Algorithm," 3rd IEEE International Advance Computing Conference (IACC), Feb. 2013, 7 pages, Best Availability: last uploaded on May 29, 2014.
Pavan et al., "An Automatic Clustering Technique for Optimal Clusters," International Journal of Computer Sciene Engineering and Applications, vol., No. 4, 2011, 13 pages retrieved from https://arxiv.org/ftp/arxiv/papers/1109/1109.1068.pdf.
Dash et al., "Feature Selection for Clustering," Lecture Notes in Computer Science, 4th Pacific-Asia Conference on Knowledge Discovery and Data Mining, PAKDD, vol. 1805, Springer Verlag, 2000, pp. 110-121. Retrieved from http://www.public.asu.edu/~huanliu/papers/pakdd00clu.pdf, 3-540-67382-2, Best Available: Apr. 18-20, 2000.

* cited by examiner

US 10,499,287 B1

SYSTEM, METHOD, AND COMPUTER PROGRAM FOR SMART INTER-RADIO ACCESS TECHNOLOGY (IRAT) VOICE OVER LONG TERM EVOLUTION (LTE) MOBILITY

FIELD OF THE INVENTION

The field of the present invention relates to Voice over Long-Term Evolution (VoLTE), and more particularly to a system for smart inter-Radio Access Technology (IRAT) voice over LTE mobility.

BACKGROUND

Radio access networks often utilize technology such as Long Term Evolution (LTE). LTE includes a communication node, known as eNodeB (eNB) or a best serving node that provides a connection between User Equipment (UE) and the network. Voice over Long-Term Evolution (VoLTE) is a voice call service delivered over Internet Protocol (IP) via an LTE access by utilizing an Internet Multimedia Subsystem (IMS) network.

Generally, in wireless network communication systems such as LTE, eNodeBs (eNBs) are utilized to provide network services to multiple UEs in their respective signal areas. One of the main challenges in providing seamless connectivity to the UEs is to perform efficient handover processes for the UEs.

In measurement-based handover, Single Radio Voice Call Continuity (SRVCC) handover is performed based on a measurement report sent by UEs to serving cells. On the other hand, in blind-based handover, the UE is directly handed over to a preconfigured neighboring cell of the serving cell. In current VoLTE systems, handover processes may be triggered due to poor coverage. The handover is initiated by an eNodeB based on the measurement report sent by the UE. However, current systems fail to check load based and priority of target cells before performing a handover to a target cell.

There is thus a need for addressing these and/or other issues associated with the prior art.

SUMMARY

A system, method, and computer program product are provided for smart inter-Radio Access Technology (IRAT) Voice over Long-Term Evolution (VoLTE) mobility. In operation, a serving cell receives an indication of poor coverage from user equipment (UE) during an active call. The serving cell determines to initiate an inter-Radio Access Technology (IRAT) handover process if the coverage for the UE has become worse than a threshold value. The serving cell identifies whether a parameter (e.g. CovTriggerdBlind-HoAllowed) indicating whether to implement a measurement-based handover or a blind-based handover for the IRAT handover process is in a conditional state. The serving cell determines to either start a proposed context timer associated with the measurement-based handover or to evaluate a load condition of a target IRAT associated with the blind-based handover, based on whether the critical coverage condition has been met based on measurement report sent by UE.

DETAILED DESCRIPTION

Figure 1:
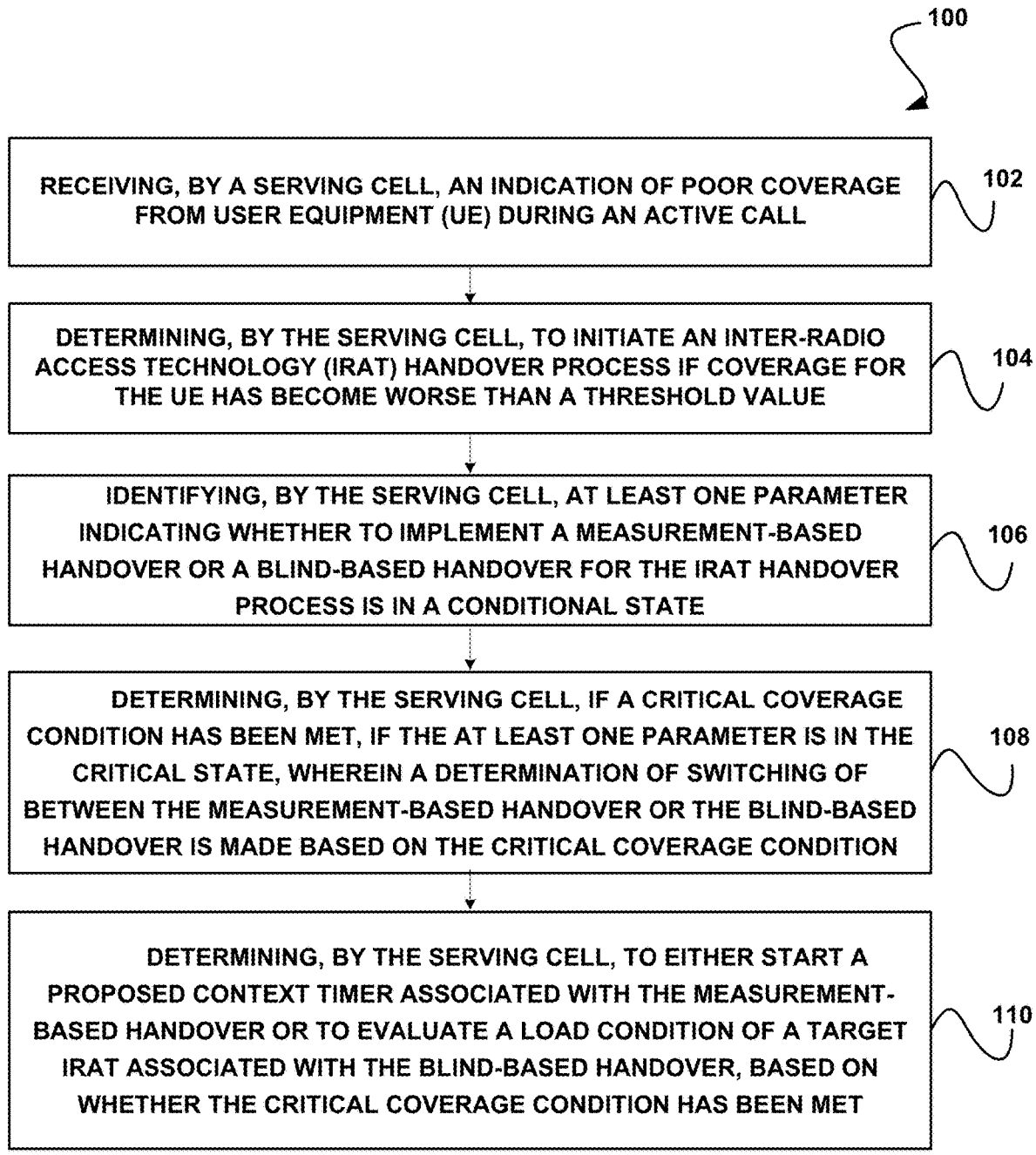
FIG. 1 illustrates a method for smart IRAT voice over LTE mobility, in accordance with one embodiment.

FIG. 1 illustrates a method 100 for smart inter-Radio Access Technology (IRAT) Voice over Long-Term Evolution (VoLTE) mobility, in accordance with one embodiment.

In operation, a serving cell (i.e. eNodeB) receives an indication of poor coverage from user equipment (UE) during an active call. See operation 102. LTE networks include a communication node, known as eNodeB (eNB) or a best serving node (i.e. the serving cell) that provides a connection between the UE and the network. The UE may be a hand-held telephone such as a mobile phone, or smart phone, a laptop computer equipped with a mobile broadband adapter, or any other communication device associated with a user.

The serving cell determines to initiate an IRAT handover process if coverage for the UE has become worse than a threshold value. See operation 104.

The serving cell identifies at least one parameter (e.g. CovTriggerdBlindHoAllowed) indicates whether to implement a measurement-based handover or a blind-based handover for the IRAT handover process is in a conditional state. See operation 106. In one embodiment, the parameter may be capable of having a true state indicating that the blind-based handover should be used, a false state indicating that the measurement-based handover should be used, or the conditional state indicating that the serving cell should determine whether the measurement-based handover or the blind-based handover should be used.

The serving cell determines if a critical coverage condition has been met, if the at least one parameter is in the critical state, where a determination of switching of between the measurement-based handover or the blind-based handover is made based on the critical coverage condition. See operation 108.

The serving cell determines to either start a proposed context timer associated with the measurement-based handover or to evaluate a load condition of a target IRAT associated with the blind-based handover, based on whether the critical coverage condition has been met. See operation 110.

In one embodiment, determining whether to implement the measurement-based handover or the blind-based handover for the IRAT handover process may include verifying that the parameter is in the conditional state and checking a critical condition threshold (e.g. A2CriticalCond threshold, etc.) value against a Quality of Service (QoS) Class Identifier (QCI1) to determine whether a critical condition is satisfied.

In this case, the serving cell may check load based conditions and priority IRAT relations for identifying potential target cell candidates for performing the blind-based handover if it is determined that the critical condition is satisfied. If it is determined that the critical condition is not satisfied, the serving cell may initiate a Single Radio Voice Call Continuity (SRVCC) procedure for the measurement-based handover. Further, determining whether to implement the measurement-based handover or the blind-based handover for the IRAT handover process may include checking load conditions in a target cell to overcome high call drop rates due to handover execution failure.

In one embodiment, a configurable timer may be used for deferring user equipment context release commands to a Mobile Mobility Entity (MME), where the configurable timer is a conditional IRAT context timer that allows the UE context release command to wait at the serving cell.

Thus, the method 100 may be implemented by a system for improving VoLTE call retention by using a conditional value that checks an occurrence of an A2 condition. Further, in one embodiment, load conditions may be checked in a target RAT to overcome high call drop rates due to handover execution failure. Still yet, in one embodiment, the method 100 may include blacklisting offender target RAT cells found during the SRVCC procedure for QCI1 services for a predefined time (e.g. Tblockcond time).

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In VoLTE, handover of ongoing or active calls to legacy systems (e.g., 2G/3G) are performed seamlessly using a Single Radio Voice Call Continuity (SRVCC) procedure. However, call drop rates may be higher in the VoLTE due to handover preparation and execution failure.

Figure 2:
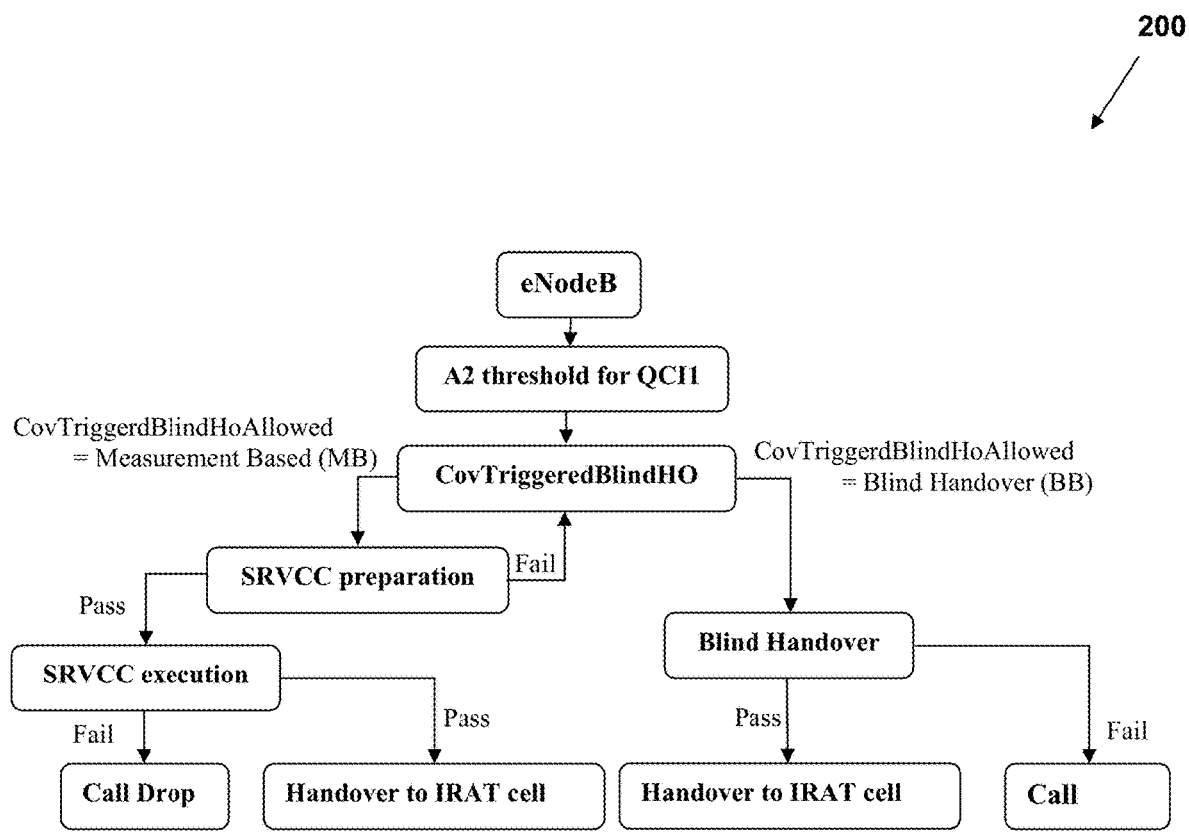
FIG. 2 shows a system flow diagram illustrating SRVCC based handover in a VoLTE system, in accordance with one example.

FIG. 2 shows a system flow diagram 200 illustrating SRVCC based handover in a VoLTE system, in accordance with one example.

Referring to FIG. 2, a SRVCC based handover to target cells may be triggered when an A2 event is triggered by user equipment (UE). It may be noted that the handover mechanism using SRVCC can be either measurement-based or blind-based. The type of handover is decided by configurable parameters, which are present in a RRC reconfiguration message. The RRC reconfiguration message is sent by eNodeB to the UE after the first measurement report satisfying A2 is triggered by the UE. An ongoing call may continue serving eNodeB until the A2 threshold for QCI1 is triggered. QCI1 is Quality of Service (QoS) Class Identifier for active voice calls.

Using a parameter "CovTriggeredBlindHO", either measurement-based or blind-based handover can be initiated. If the parameter CovTriggeredBlindHO is true, then blind-based handover is initiated and handover to IRAT cell is performed without taking into account a prior load scenario at a target cell and if the blind-based handover fails, then the call gets dropped.

On the other hand, if blind-based handover is not allowed, then measurement-based handover using SRVCC is initiated for handover to the IRAT cell. The SRVCC includes a SRVCC preparation phase and SRVCC execution phase. If SRVCC preparation is passed or successful, then SRVCC execution continues for the handover. However, if SRVCC preparation fails, the call is dragged in the LTE cell.

When the SRVCC execution passes, then handover to the IRAT cell is successfully performed. However, if the SRVCC execution fails, then the call gets dropped.

The failure in the handover execution affects VoLTE call retainability and prevents systems from achieving better user experience.

The methods and systems described herein provide smart inter-RAT voice over LTE mobility, which addresses these issues, etc. In the system described herein, both measurement-based and preconfigured-cell based blind handover are combined. In this approach, pros of both handover mechanisms can be utilized. Moreover, the system implements a method that includes introducing a conditional value for the CovTriggeredBlindHO parameter. The conditional value helps in checking an occurrence of an A2 critical condition in VoLTE. An A2 critical condition is the condition that occurs when radio conditions are severe and a VoLTE call cannot be sustained. A configurable timer at eNodeB is used to delay sending a UE context release command to a MME when the UE is moved to a legacy cell by SRVCC.

Furthermore, the system implements a method that may also include checking load conditions in the target IRAT and providing a relative weightage to a lower loaded cell that can help in overcoming high call drop rates. Load conditions may be checked for setting a threshold based on load threshold at IRAT target cells. This can help in achieving better VoLTE retention and better user experience. The VoLTE drop rates can be remarkably reduced. Moreover, handover execution rate in case of inter RAT can be improved.

Figure 3:
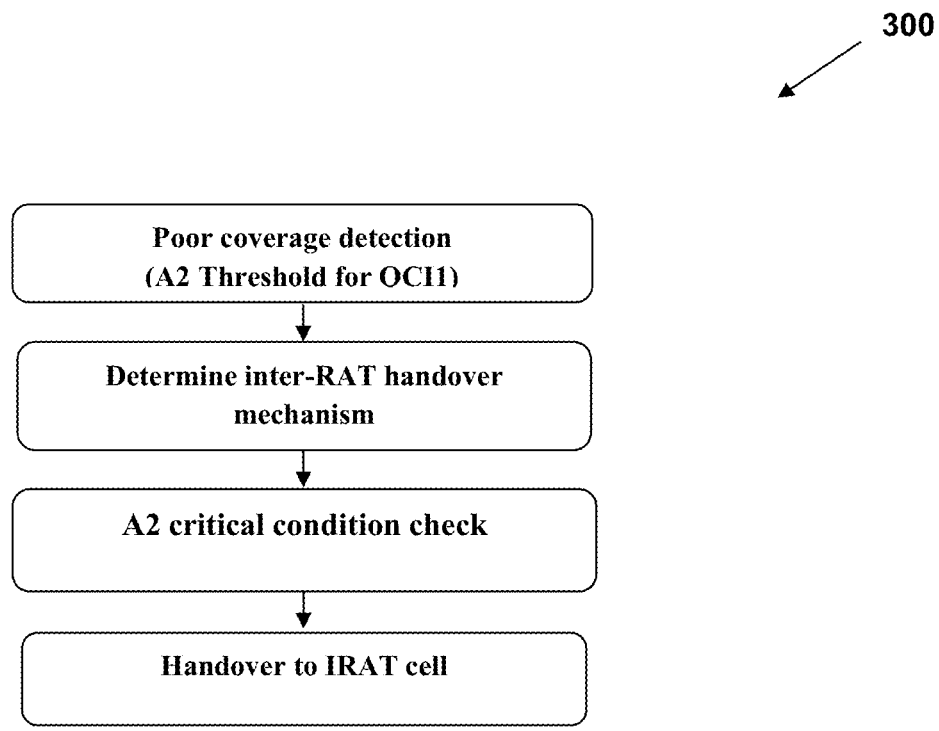
FIG. 3 shows a flow diagram for smart IRAT voice over LTE mobility, in accordance with one embodiment.

FIG. 3 shows a flow diagram 300 for smart inter-RAT voice over LTE mobility, in accordance with one embodiment. As an option, the flow diagram 300 may be implemented in the context of the details of the previous figures and/or any subsequent figure(s). Of course, however, the flow diagram 300 may be implemented in the context of any desired environment. Further, the aforementioned definitions may equally apply to the description below.

As a first step, when there is a poor coverage of a serving cell (i.e., source eNodeB) during an active call, a UE detects the poor coverage and accordingly triggers an A2 threshold for QCI1. After crossing the A2 threshold for QCI1, the UE informs the eNodeB to initiate an IRAT handover process by sending a measurement report.

As a second step, the eNodeB then checks for a parameter that helps in determining whether a measurement-based handover or blind-based handover is applicable for the IRAT handover. The parameter is a CovTriggerdBlindHoAllowed that has a new value as "CONDITIONAL".

As a third step, the eNodeB checks if the A2 critical condition is satisfied or not, using a parameter A2CriticalCond. If A2CriticalCond threshold for QCI1 is satisfied, then for each IRAT relation, both load based and configured priority is checked for a blind-based handover. Single Radio Voice Call Continuity (SRVCC) is performed based on UE measurements when the A2 critical condition is not satisfied.

As a fourth step, as per the condition satisfied in the third step, IRAT handover (SRVCC) is performed based on measurements or blind handover.

The detailed process for smart inter-RAT voice over LTE mobility can be understood as explained with reference to a system flow diagram shown in FIG. 4.

Figure 4:
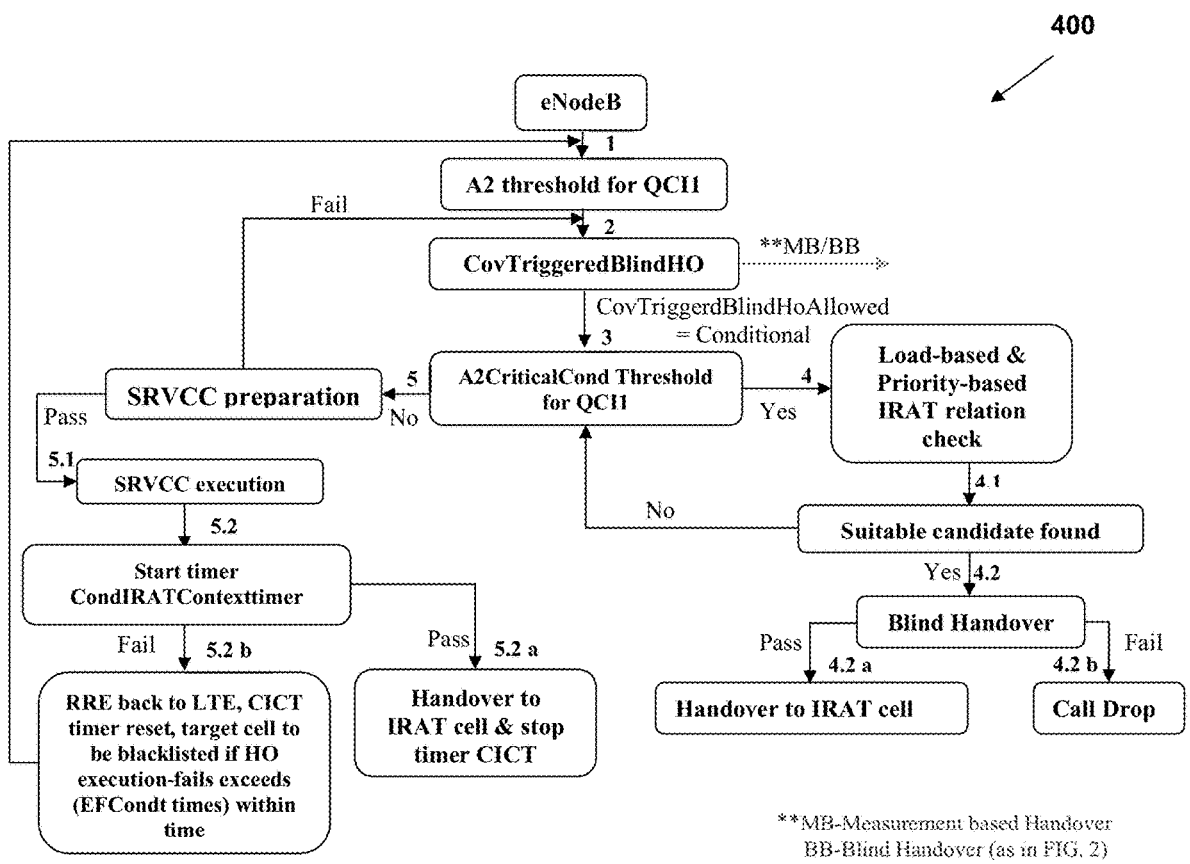
FIG. 4 shows a system flow diagram for smart IRAT voice over LTE mobility, in accordance with one embodiment.

FIG. 4 shows a system flow diagram 400 for smart inter-RAT voice over LTE mobility, in accordance with one embodiment. As an option, the system flow diagram 400 may be implemented in the context of the details of the previous figures and/or any subsequent figure(s). Of course, however, the system flow diagram 400 may be implemented in the context of any desired environment. Further, the aforementioned definitions may equally apply to the description below.

Step 1: eNodeB checks condition of A2 threshold for QCI1 when triggered by a UE. Step 2: eNodeB checks a parameter "CovTriggeredBlindHO" for determining measurement-based, blind-based handover, or Conditional. Step 3: eNodeB checks "A2CriticalCond" threshold for QCI1. If yes, go to Step 4. Else, go to Step 5.

Step 4: eNodeB checks load based conditions and priority IRAT relations for identifying potential target cell candidates for IRAT handover. Step 4.1: eNodeB checks the target RAN and Pre-Configured IRAT cells regarding load conditions. Additional information regarding load criteria is described below in the context of load exchange with neighbor cells. A priority list for target cells is then created accordingly. The target cell load condition can be compared with a configurable parameter "TargetRATCondLoadThresh".

TargetRATCondLoadThresh is a value that sets a threshold regarding load threshold at IRAT target cells. If greater than one target cells TargetRATCondLoadThresh are met, then the handover will always happen to the most prioritized cell that is already defined in the network. If a suitable target cell is found, then blind-based handover will be performed on that target cell. In the case no suitable target cell is found, then the search for suitable cells will be continued.

Step 4.2: Perform blind-based handover. Step 4.2 a: If blind-based handover is successful, then handover of IRAT cell is executed successfully. Step 4.2 b: Else, if blind-based handover fails, then call is dropped.

Step 5: SRVCC is initiated using measurement based procedure. SRVCC preparation phase starts for the handover. If it fails, then go to Step 2. Else, if SRVCC preparation phase passes, then go to Step 5.1.

Step 5.1: Enter into SRVCC execution phase. Step 5.2: At eNodeB, a configurable timer "CondIRATContextimer" (CICT timer) starts. The timer helps in deferring the UE context release command from eNodeB towards MME. If SRVCC execution passes, then go to Step 5.2 a. Else, go to Step 5.2 b.

Step 5.2 a: In case of SRVCC execution pass, CICT timer stops and IRAT handover is executed successfully. Step 5.2 b: In case of SRVCC execution fail, eNodeB waits for the CICT timer expiry. Meanwhile, when the timer is running, the UE tries to perform RRC reestablishment to LTE cell to continue an ongoing VoLTE call. Also, the UE updates eNodeB regarding the target cell incapability to accept the handover request if handover execution fails exceeds "EFCond times" within time "BlacklistCondtime".

It may be noted that eNodeB may facilitate blacklisting for the UE having QCI1 bearer including multi E-Radio Access Bearer (ERAB). The eNodeB temporarily blacklists the target IRAT cell for QCI1 for a duration based on a configurable timer (Tblockcond).

Thus, the system implementing the techniques described herein may utilize proposed values and conditions, including: a new value for CovTriggerdBlindHoAllowed=CONDITIONAL; A2CriticalCond which is newly proposed in VoLTE, which is similar to A2Critical in LTE; CondIRATContexttimer (CICT) timer that is introduced at the eNodeB end, where the timer helps to delay in sending UE context release command to the MME; a threshold value TargetRATCondLoadThresh that sets a threshold regarding a load threshold at IRAT target cells; a condition value Tblockcond provided by the UE to the eNodeB to blacklist a target cell for some time (BlacklistCondtime); HofaillRAT that is a value that gives the count of handover failures towards a particular IRAT cell during preparation or execution phase; a new counter Blacklistcount that denotes the number of times an execution fails on a target IRAT cell after which the target cell will be blacklisted (if condition is satisfied for BlacklistCondtime); BlacklistCondtime that denotes the time in which Blacklistcount number of execution fails are happening; and a Blacklisttime that is the timer that denotes the time for which the target IRAT cell would be blacklisted for each occurrence of blacklist. Of course, the specific names of such values and conditions may vary based on implementation.

Different use cases for smart IRAT VoLTE mobility that can be implemented in real-time scenarios are explained in the context of the following figures.

Figure 5:
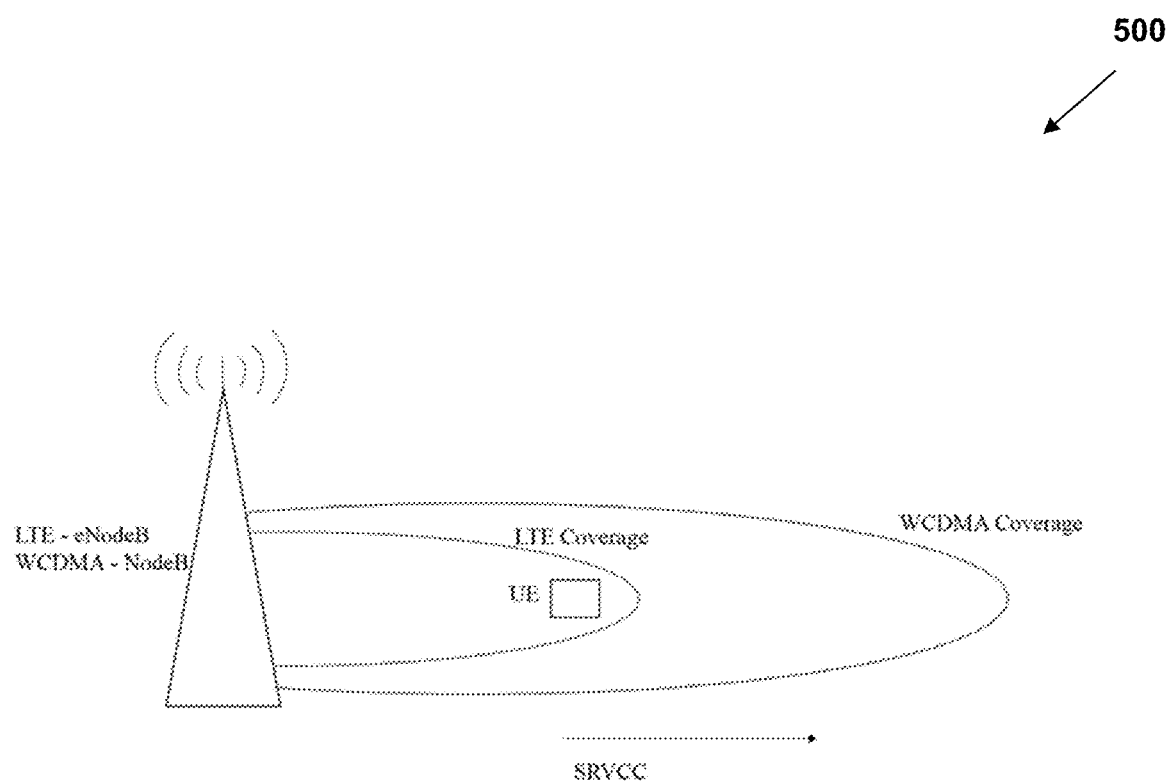
FIGS. 5-7 show examples of a use case for smart IRAT voice over LTE mobility when a UE under LTE coverage moves to UMTS coverage, in accordance with one embodiment.
Figure 6:
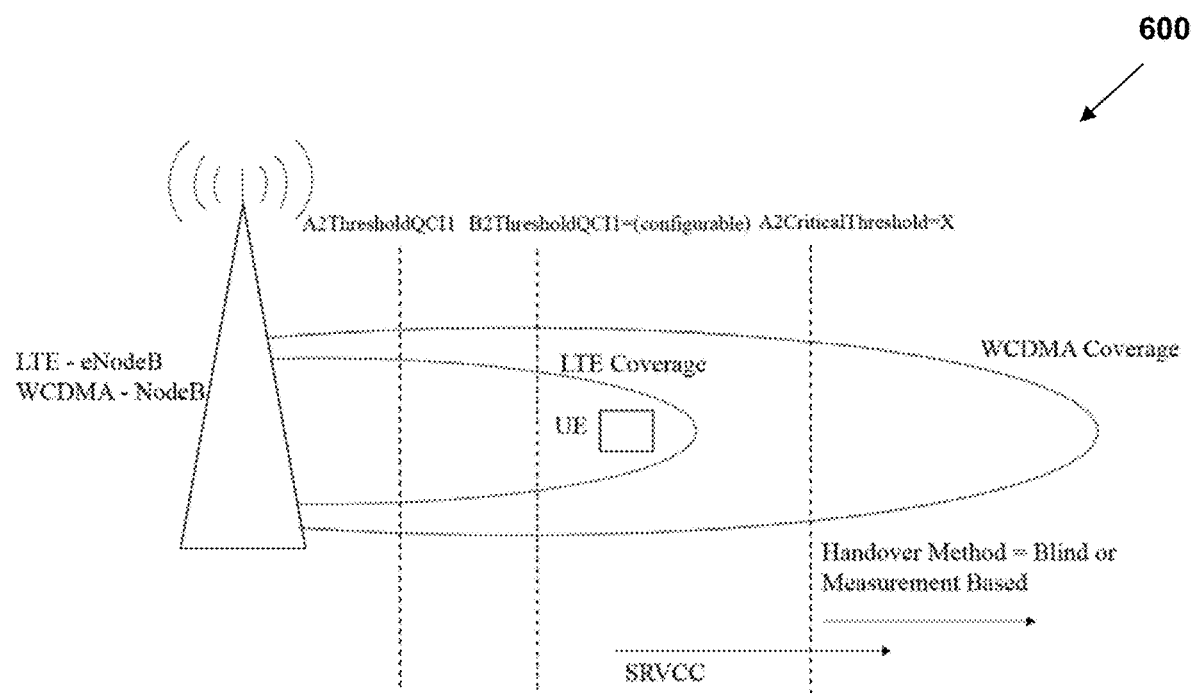
Figure 7:
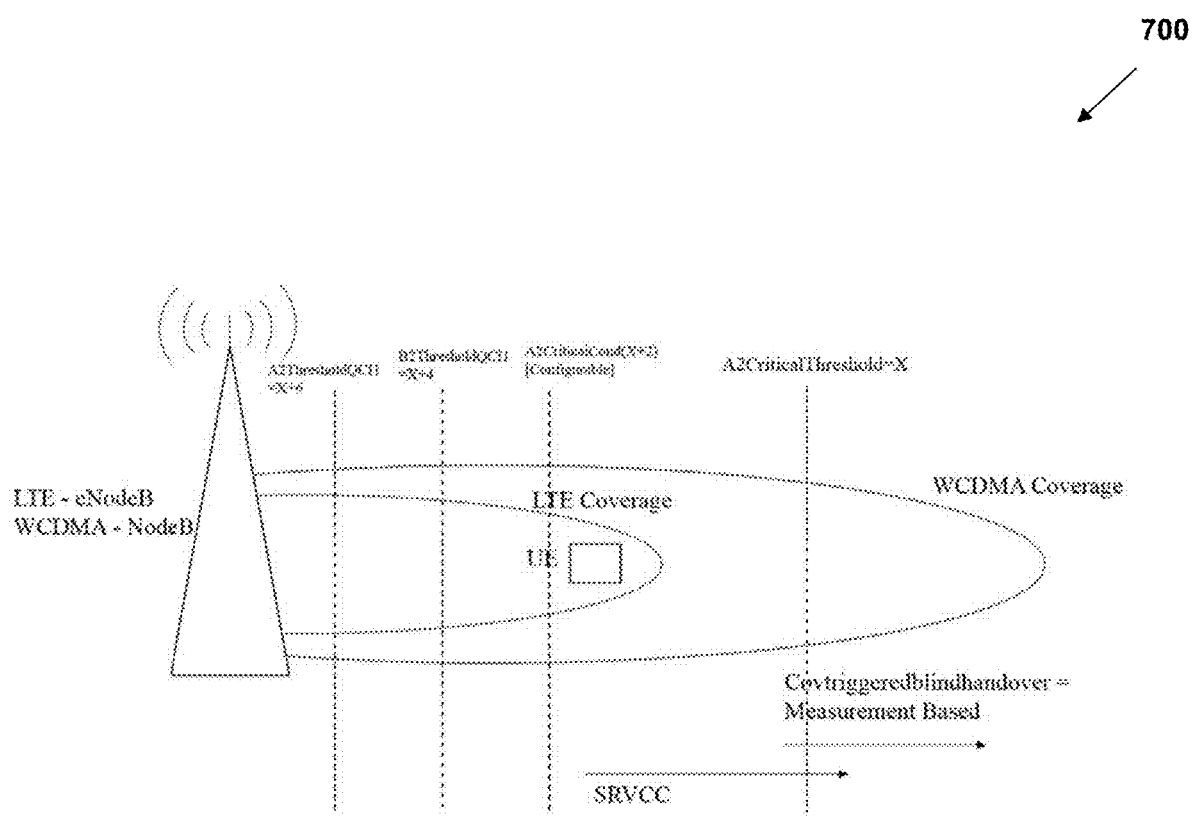

FIGS. 5-7 show examples 500-700 of a use case for smart inter-RAT voice over LTE mobility when a UE under LTE coverage moves to UMTS coverage, in accordance with one embodiment. As an option, the examples 500-700 may be implemented in the context of the details of the previous figures and/or any subsequent figure(s). Of course, however, the examples 500-700 may be implemented in the context of any desired environment. Further, the aforementioned definitions may equally apply to the description below.

Referring to FIG. 5, an exemplary representation is shown when a UE in LTE coverage is moving towards a 3G network coverage. The source cell of the UE is eNodeB of LTE and the target cell is NodeB of WCDMA. As a first step, when the UE approaches the end of LTE coverage, or when LTE coverage is weak, SRVCC handover will be initiated.

As a second step, thresholds such as A2 threshold for QCI1, B2 threshold for QCI1, and A2 critical threshold for SRVCC measurement trigger are checked and handover is initiated. The handover method can either be blind or measurement based, as shown in FIG. 6.

FIG. 6 shows an A2 event at the source cell followed by a B2 event. A SRVCC handover trigger based on an A2 event at the source is shown in FIG. 7.

In this example, there are some assumptions for the SRVCC trigger. In this case, A2ThresholdQCI1 is triggered for starting the IRAT measurement on the source cell when the UE has a QCI1 bearer. The A2ThresholdQCI1 is assumed to be triggered when: 6 dB higher than A2CriticalThreshold [threshold for Blind HO/IRAT Rel with redirect for UE with packet-switched (PS) bearer only]; 4 dB higher than A2CriticalCond [threshold for Blind HO/IRAT Rel with redirect for UE with QCI1 bearer]; and 2 dB higher than B2ThresholdQCI1 [threshold for starting measurements on IRAT Neighbor cell for UE with a QCI1 bearer].

Figure 8:
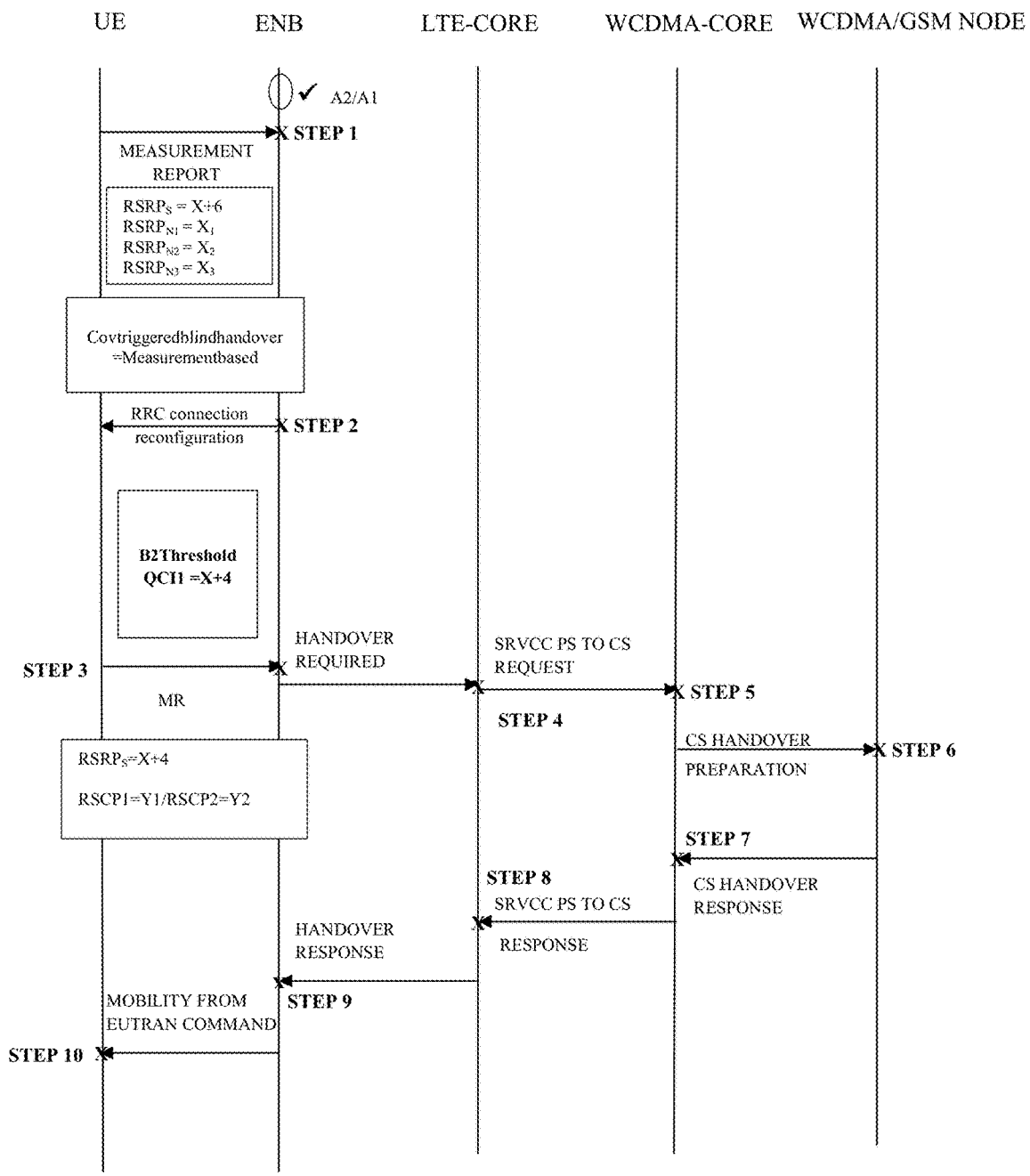
FIG. 8 shows a system flow diagram illustrating a SRVCC call flow for measurement-based handover, in accordance with one embodiment.

The communication flow for measurement-based SRVCC handover is described in FIG. 8.

FIG. 8 shows a system flow diagram 800 illustrating a SRVCC call flow for measurement based handover, in accordance with one embodiment. As an option, the system flow diagram 800 may be implemented in the context of the details of the previous figures and/or any subsequent figure(s). Of course, however, the system flow diagram 800 may be implemented in the context of any desired environment. Further, the aforementioned definitions may equally apply to the description below.

FIG. 8 shows the SRVCC call flow implemented by the system described herein for measurement based handover. The process involved in SRVCC call flow for CovTriggeredBlindHO=Measurement-based is detailed in the context of the following steps.

Step 1: RSRP on the source cell for the UE reaches the level of A2thresoldQCI1 threshold for starting IRAT measurements for a UE with QCI 1 bearer followed by the UE sending an event triggered measurement report.

Step 2: After confirming parameter, CovTriggeredBlindHO=Measurement, ENB sends an RRC Connection Reconfiguration message in the DL with the report configuration details for B2 event (measurement Id, thresholds etc.).

B2thresholdQCI1=X+4 in the considered example (i.e., 2 dBm after the measurement trigger).

Step 3: Once the conditions for B2 event (Source Cells RSRP degrades below that of B2thresholdQCI1 and at the same time a Target IRAT cell becomes better than B2threshold2utra), the UE sends a measurement report with details of the source cell's serving level and that of the potential IRAT neighboring cells RSCP (assuming SRVCC to UMTS).

Step 4: The ENB sends a handover request message with details of the target IRAT cell with the highest RSCP in the measurement report from the UE to the MME.

Step 5: The MME sends a PS to CS Handover request to the MSC-S(Mobile Switching Center Server) with details of the target RNCID and cellID (based on the measurement report from UE in Step 3).

Step 6: The IRAT target cell is prepared for the incoming handover (i.e., resource reservation).

Step 7: The IRAT target cell confirms resource reservation and responds with a CS Handover response to the IRAT Core node.

Step 8: The MSC-S now acknowledges the PS to CS handover request by sending a PS to CS handover response (containing cause—request accepted) to the MME.

Step 9: The MME now sends a handover response to the ENB which would be the contents of the handover command to be sent to the UE subsequently.

Step 10: The source cell now sends mobility from EUTRAN command instructing the UE to move to the IRAT target cell.

Figure 9:
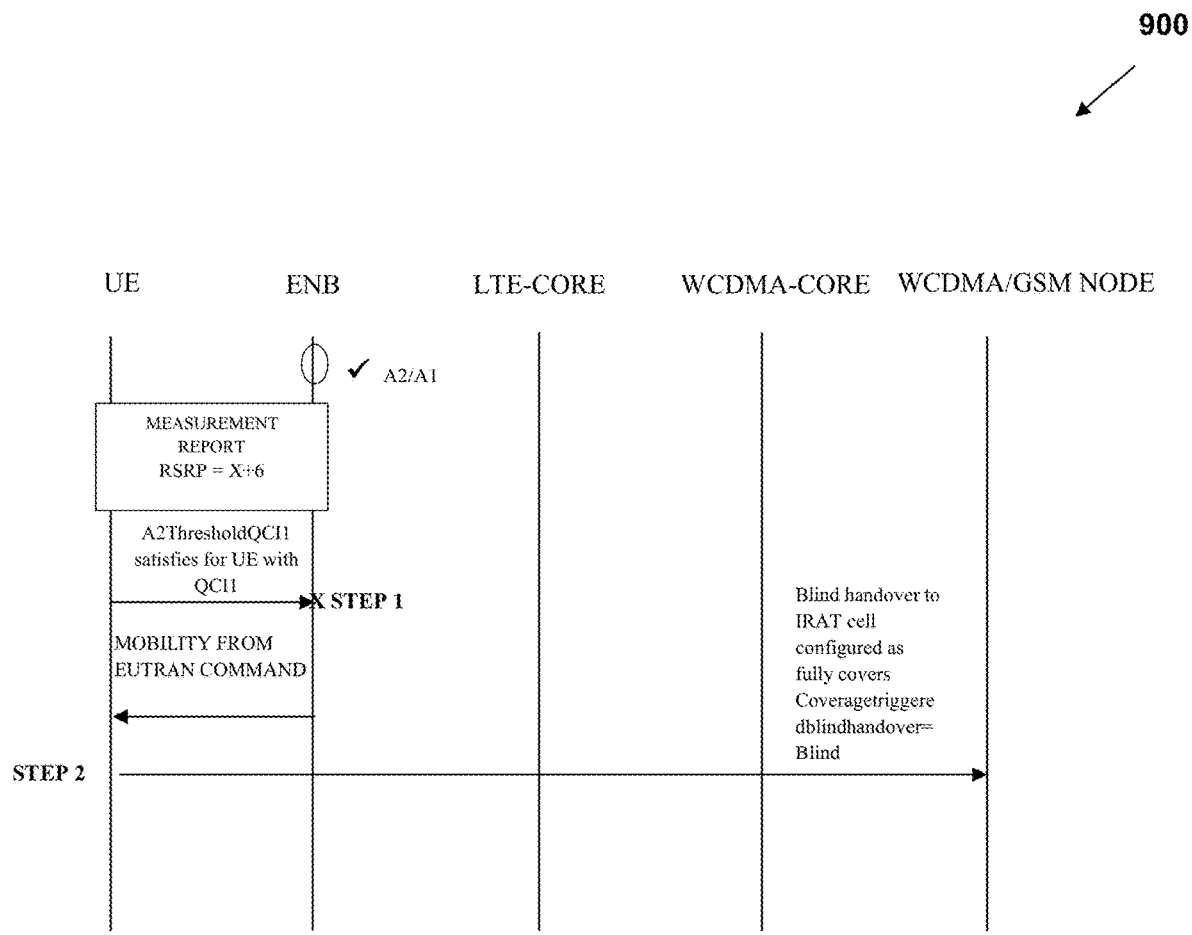
FIG. 9 shows a system flow diagram illustrating a SRVCC call flow for blind-based handover, in accordance with one embodiment.

The communication flow for measurement-based SRVCC handover is described in FIG. 9.

FIG. 9 shows a system flow diagram 900 illustrating a SRVCC call flow for blind-based handover, in accordance with one embodiment. As an option, the system flow diagram 900 may be implemented in the context of the details of the previous figures and/or any subsequent figure(s). Of course, however, the system flow diagram 900 may be implemented in the context of any desired environment. Further, the aforementioned definitions may equally apply to the description below.

FIG. 9 shows the SRVCC Call flow implemented by the system described herein for blind-based handover. The steps involved in the process of SRVCC call flow for CovTriggeredBlindHO=Blind-based is described below.

Step 1: RSRP on the source cell for the UE reaches the level of A2ThresholdQCI1 (Threshold–blind HO/redirect for a UE with QCI1 bearer depending on parameter mobility action).

Step 2: The source cell now sends a mobility from EUTRAN command instructing the UE to move to the IRAT target cell preconfigured at the source cell for blind handover.

Figure 10:
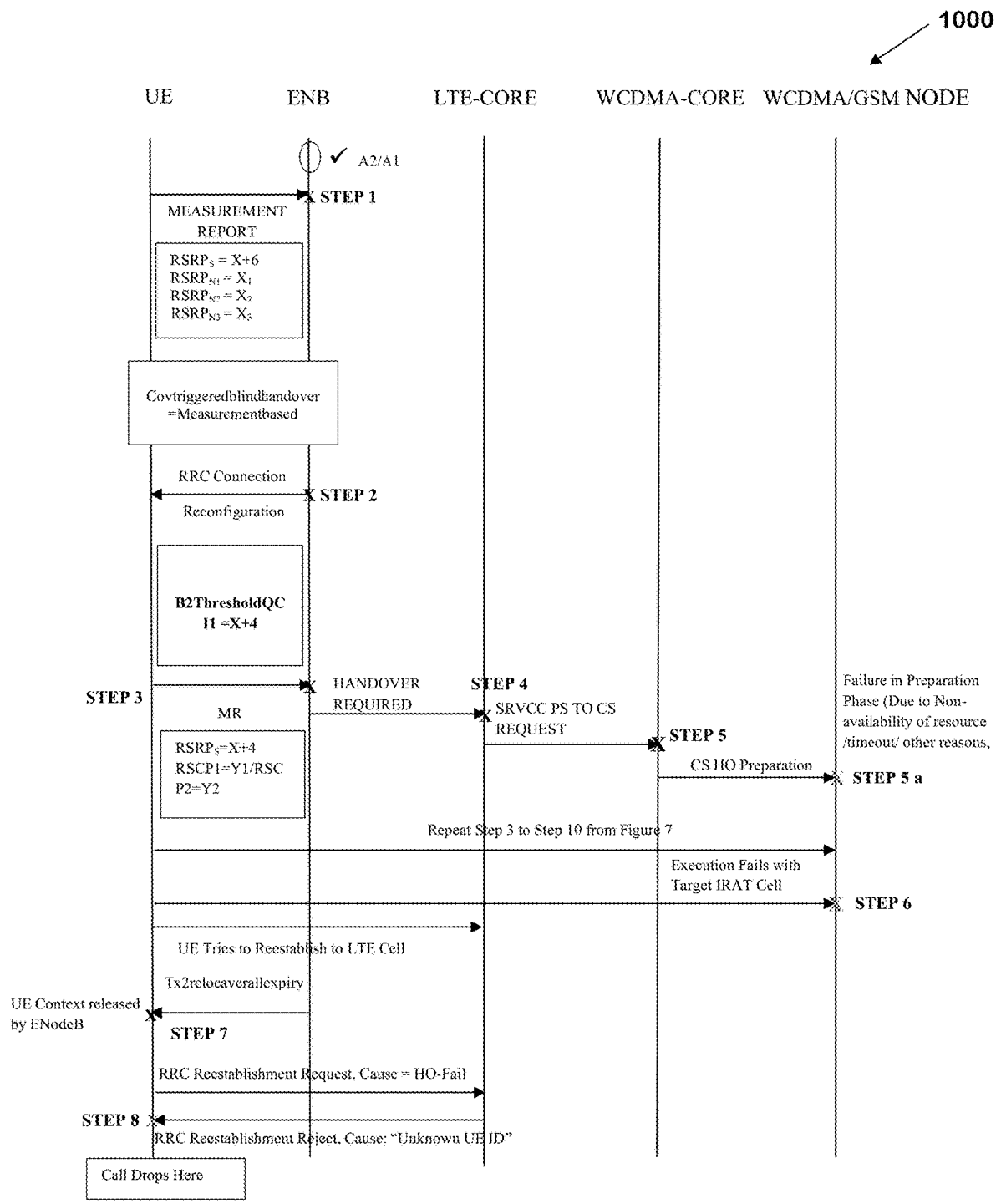
FIG. 10 shows a system flow diagram illustrating handover failure, in accordance with one embodiment.

FIG. 10 shows a system flow diagram 1000 illustrating handover failure, in accordance with one embodiment. As an option, the system flow diagram 1000 may be implemented in the context of the details of the previous figures and/or any subsequent figure(s). Of course, however, the system flow diagram 1000 may be implemented in the context of any desired environment. Further, the aforementioned definitions may equally apply to the description below.

FIG. 10 shows the failure of handover implemented by the system for measurement-based handover. The following steps describe the process of a SRVCC call flow for CovTriggeredBlindHO=Measurement-based.

Step 1: RSRP on the source cell for the UE reaches the level of A2thresoldQCI1 threshold for starting IRAT measurements for a UE with QCI 1 bearer followed by the UE sending an event triggered measurement report.

Step 2: After confirming parameter CovTriggeredBlindHO=Measurement, the ENB sends an RRC Connection Reconfiguration message in the DL with the report configuration details for B2 event (measurement Id, thresholds etc.).

B2thresholdQCI1=X+4 in the considered example (i.e., 2 dBm after the measurement trigger).

Step 3: Once the conditions for B2 event (Source Cells RSRP degrades below that of B2thresholdQCI1 and at the same time a Target IRAT cell becomes better than B2threshold2utra), the UE sends a measurement report with details of the source cell's serving level and that of the potential IRAT neighboring cells RSCP (assuming SRVCC to UMTS).

Step 4: The ENB sends a handover request message with details of the target IRAT cell with the highest RSCP in the measurement report from the UE to the MME.

Step 5: The MME sends a PS to CS Handover request to the MSC-S(Mobile Switching Center Server) with details of the target RNCID and cellID (based on the measurement report from the UE in Step 3).

Step 5 a: Handover failure takes place during the preparation phase due to non-availability of resource, timeout, or due to other reasons.

Step 6: Repeat Step 3 to Step 10 from FIG. 8. In other words, another measurement report for condition B2 in which PS to CS request is made. The handover failure can also take place in the execution phase (any cause).

Step 7: The UE tries to reestablish with the source cell (assumed to be the strongest cell at that point). In the meantime, the TS1relocoverall timer expires. The TS1relocoverall, which starts from the point where the source ENB, sends the handover request and stops once the source ENB receives the indication of successful handover from the MME. The TX2relocoverall is the timer guarding the handover (TS1relocoverall) that takes place over X2 has abnormally expired. After the expiry of TS1relocoverall, the ENB releases the UE context subsequently.

Step 8: The UE sends a RRC reestablishment request to the source LTE cell which gets rejected subsequently with cause "Unknown UE ID" and the call drops.

Steps 1 to 5 are repeated with the same target cell as long as it is reported as it meets the B2 criterion, hence the VoLTE drops on the LTE cell increases.

Figure 11:
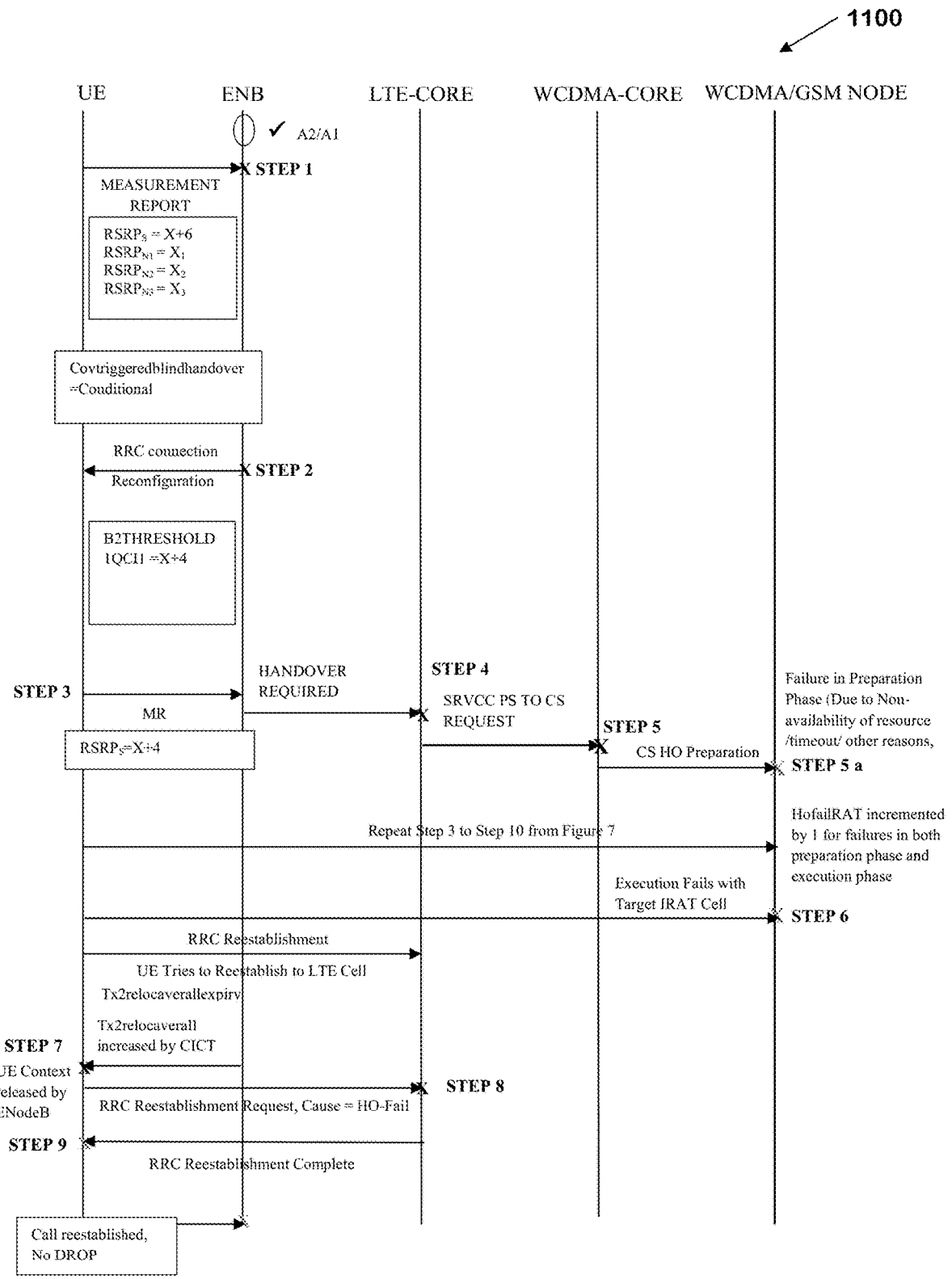
FIG. 11 shows a system flow diagram illustrating handover execution failure, in accordance with one embodiment.

FIG. 11 shows a system flow diagram 1100 illustrating handover execution failure, in accordance with one embodiment. As an option, the system flow diagram 1100 may be implemented in the context of the details of the previous figures and/or any subsequent figure(s). Of course, however, the system flow diagram 1100 may be implemented in the context of any desired environment. Further, the aforementioned definitions may equally apply to the description below.

FIG. 11 shows the SRVCC handover execution failure, where a new value for CovTriggerdBlindHoAllowed=CONDITIONAL is proposed. The steps involved in the process of SRVCC call flow for CovTriggeredBlindHO=Conditional are described below.

Step 1: RSRP on the source cell for the UE reaches the level of A2thresoldQCI1 threshold for starting IRAT measurements for a UE with QCI 1 bearer followed by the UE sending an event triggered measurement report.

Step 2: As the CoveragetriggeredblindHO is enhanced with a value of Conditional (i.e., CoveragetriggeredblindHO=Conditional), the ENB sends an RRC Connection Reconfiguration message in the DL with the report configuration details for B2 event (measurement Id, thresholds etc.). B2thresholdQCI1=X+4 in the considered example (i.e., 2 dBm after the measurement trigger).

Step 3: Once the conditions for the B2 event (Source Cells RSRP degrades below that of B2thresholdQCI1 and at the same time a Target IRAT cell becomes better than B2threshold2utra), the UE sends a measurement report with details of the source cell's serving level and that of the potential IRAT neighboring cells RSCP (assuming SRVCC to UMTS).

Step 4: The ENB sends a handover request message with details of the target IRAT cell with the highest RSCP in the measurement report from the UE to the MME.

Step 5: The MME sends a PS to CS Handover request to the MSC-S(Mobile Switching Center Server) with details of the target RNCID and cellID (based on the measurement report from the UE in Step 3).

Step 5 a: Handover failure takes place during the preparation phase due to non-availability of resource, timeout, or due to other reasons.

Step 6: Repeat Steps 3 to Step 10 from FIG. 8. In other words, another measurement report for condition B2 in which PS to CS request is made. The handover failure can also take place in the execution phase (any cause).

Step 7: The UE tries to reestablish with the source cell (assumed to be the strongest cell at that point). In the meantime, the TS1relocoverall timer expires, however now the UE context is retained additionally until CICT expiry (CICT Conditional IRAT context timer).

Step 8: The UE sends a RRC reestablishment request to the source LTE cell which is successful as the UE context is available at the source cell.

Step 9: The source ENB increments hofailIRAT by one towards this target cell for each instance of failed handover attempt towards the target IRAT cell (failure can be in the preparation phase or execution phase).

Step 10: If the hofailIRAT reaches the value blacklistcount in BlacklistCondtime, the target cell is blacklisted, for blacklisttime (Configurable), else the counter is reset if BlacklistCondtime expires.

Step 11: After blacklisting, the UE is informed of all the blacklisted cells by means of an RRCConnectionreconfiguration (BlacklistedIRATcelllist). Once the timer blacklisttimer expires the list is updated subsequently.

Steps 1 to 5 are repeated with the same target cell and the SRVCC can now be attempted to the same cell/new cell.

Figure 12:
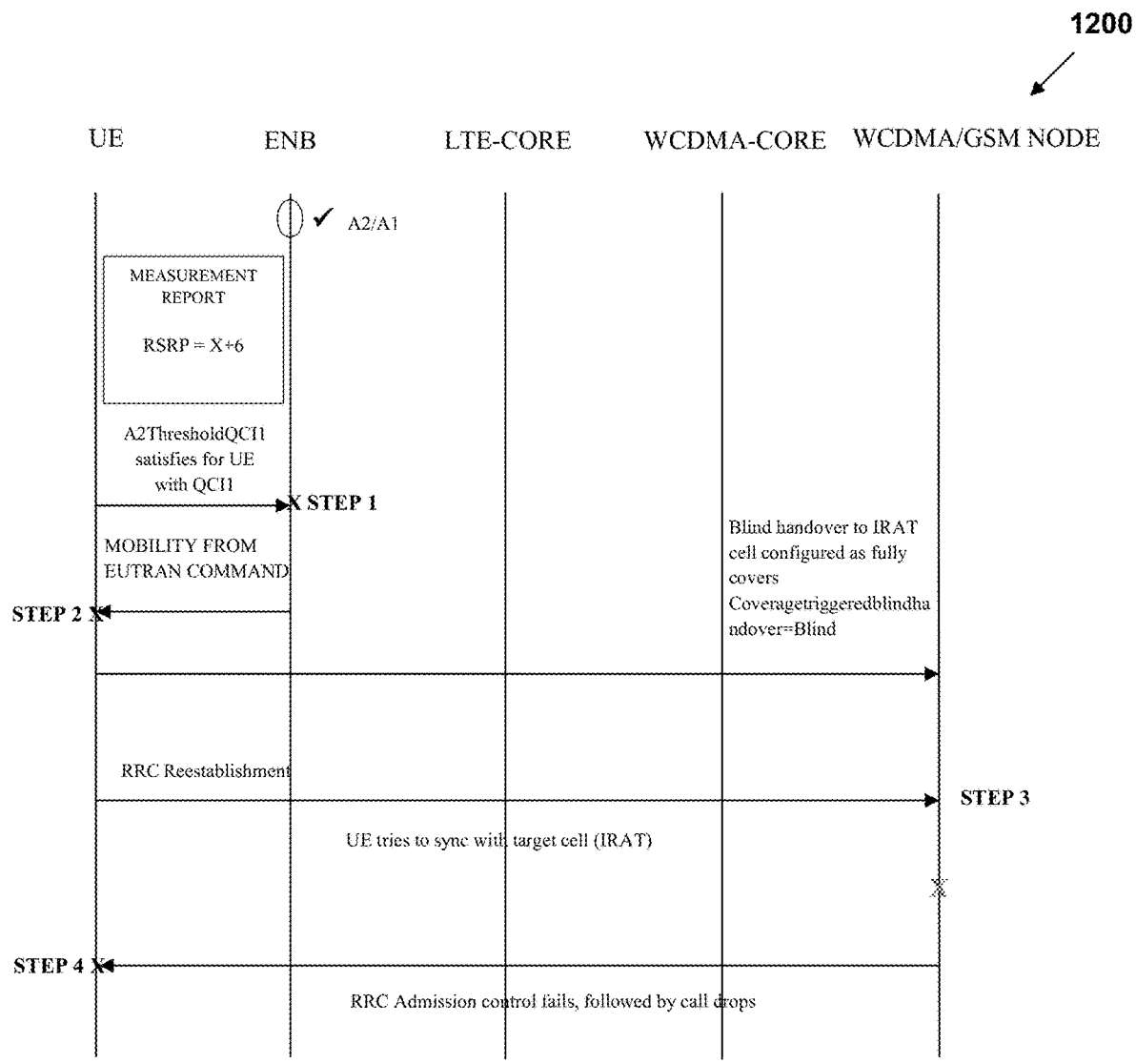
FIG. 12 shows a system flow diagram illustrating handover failure for blind-based handover, in accordance with one embodiment.

FIG. 12 shows a system flow diagram 1200 illustrating handover failure for blind-based handover, in accordance with one embodiment. As an option, the system flow diagram 1200 may be implemented in the context of the details of the previous figures and/or any subsequent figure(s). Of course, however, the system flow diagram 1200 may be implemented in the context of any desired environment. Further, the aforementioned definitions may equally apply to the description below.

Following are the steps involved in the process of SRVCC handover execution failure for CovTriggeredBlindHO=Blind-based.

Step 1: The UE sends a measurement report once it reaches threshold A2ThresholdQCI1.

Step 2: ENB sends mobility from EUTRAN command to send the UE to a preconfigured UMTS.

Step 3: The UE rejected due to fails in radio admission control on the target cell.

Figure 13:
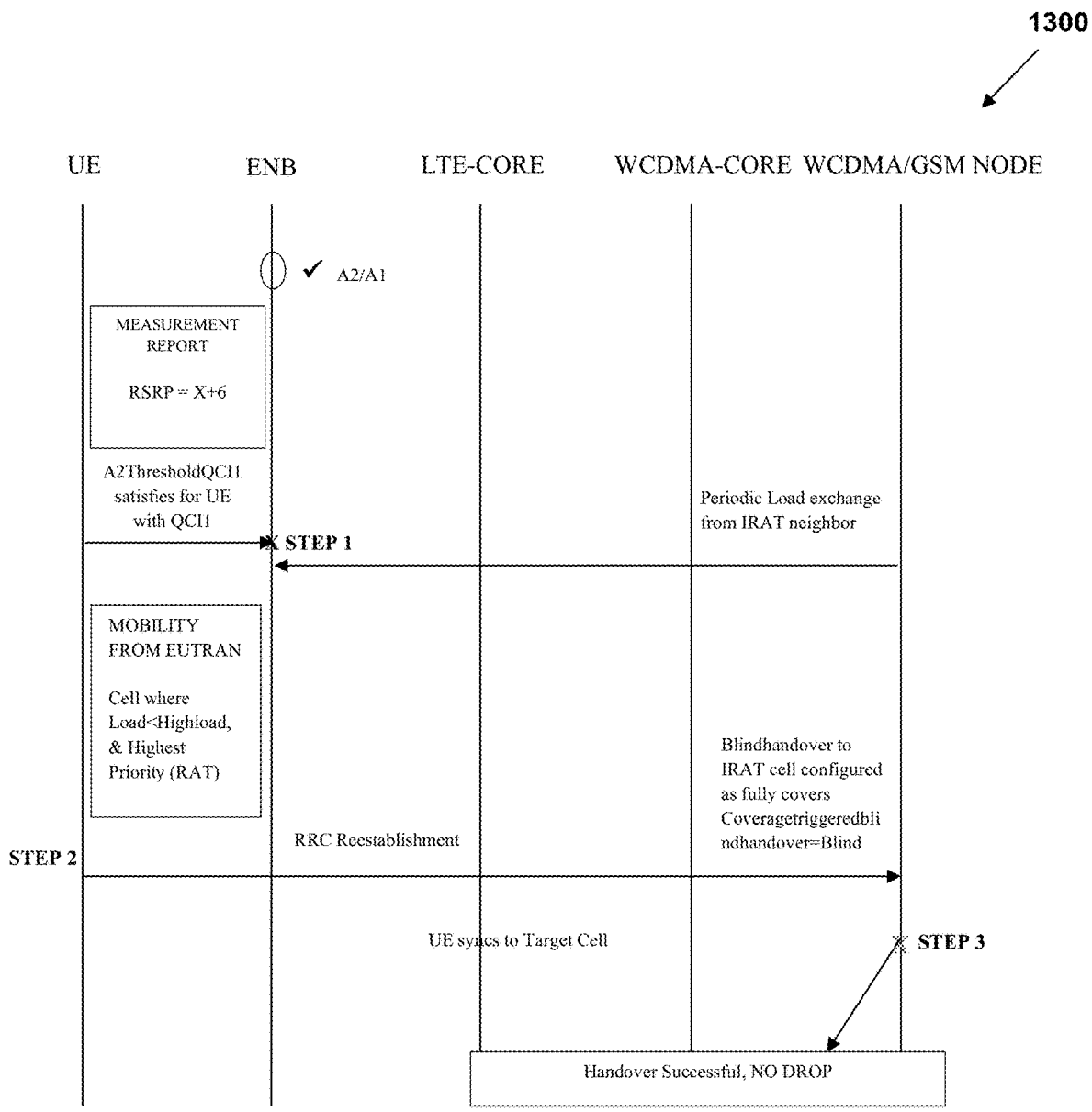
FIG. 13 shows a system flow diagram illustrating handover execution failure for blind-based handover, in accordance with one embodiment.

FIG. 13 shows a system flow diagram 1300 illustrating handover execution failure for blind-based handover, in accordance with one embodiment. As an option, the system flow diagram 1300 may be implemented in the context of the details of the previous figures and/or any subsequent figure(s). Of course, however, the system flow diagram 1300 may be implemented in the context of any desired environment. Further, the aforementioned definitions may equally apply to the description below.

The steps involved in the process of SRVCC HO execution failure for CovTriggeredBlindHO=Conditional are described below.

Step 1: The UE sends a measurement report once it reaches threshold A2ThresholdQCI1. Step 1 a: ENB gets periodic load information from the target cell (IRAT).

Step 2: ENB ranks all the IRAT neighbor with load <Highloadthreshold (configurable) and orders the cell by decreasing order of priority.

Step 2 a: The UE is released by blind handover to the target cell with the highest priority, provided its current load is <Highloadthreshold.

Step 3: UE successfully syncs to target cell and no drops.

In order to perform load information exchange with neighbor cells of a RAT other than LTE, an eNodeB can trigger a "Cell Load Reporting Request/Response" procedure towards a neighboring RNC for WCDMA, a BSC for GSM or evolved HSPA Nodeb for HSPA. S1 interface is used to exchange the load information.

This new IRAT procedure is independent of the handover procedure in that it can be triggered at any time by a requesting eNodeB even in the absence of any mobility event.

This procedure may be implemented as a generic 'SON Transfer' container carried on top of the RAN Information Management (RIM) protocol.

The new IRAT cell load reporting procedure allows an eNodeB to evaluate the load situation of GSM or UMTS/HSPA neighboring cells before triggering any load related actions such as handing traffic over to those neighbors.

The load information contains: Cell Capacity class value; UL/DL relative capacity indicator; and UL/Dl available capacity for load balancing as percentage of total cell capacity.

In one embodiment, there may be two types of load reporting mechanisms available. According to operator requirements, one can configure this reporting, which is considered in the above use cases. One mechanism may include, event triggered reporting. In this case, a source RAN node may be enabled to request a target RAN node to report only when a pre-defined cell load level threshold is crossed in a target node.

The source node may signal the granularity with which it wishes to receive indications of load variation. For example, if it requests a granularity of five levels, the target RAN node will divide the cell load scale by five evenly distributed on a linear scale below the overload threshold and will report the target cell load each time the load changes from one reporting level to another or enters the overload state.

Another mechanism may include multiple cell reporting. In this case, a source RAN node may be enabled to request the target RAN node to report the load of multiple cells within a single report. For example, in case of UMTS, an ENB will only need to send one request to RNC instead of individual requests for all the cells controlled by that RNC.

Figure 14:
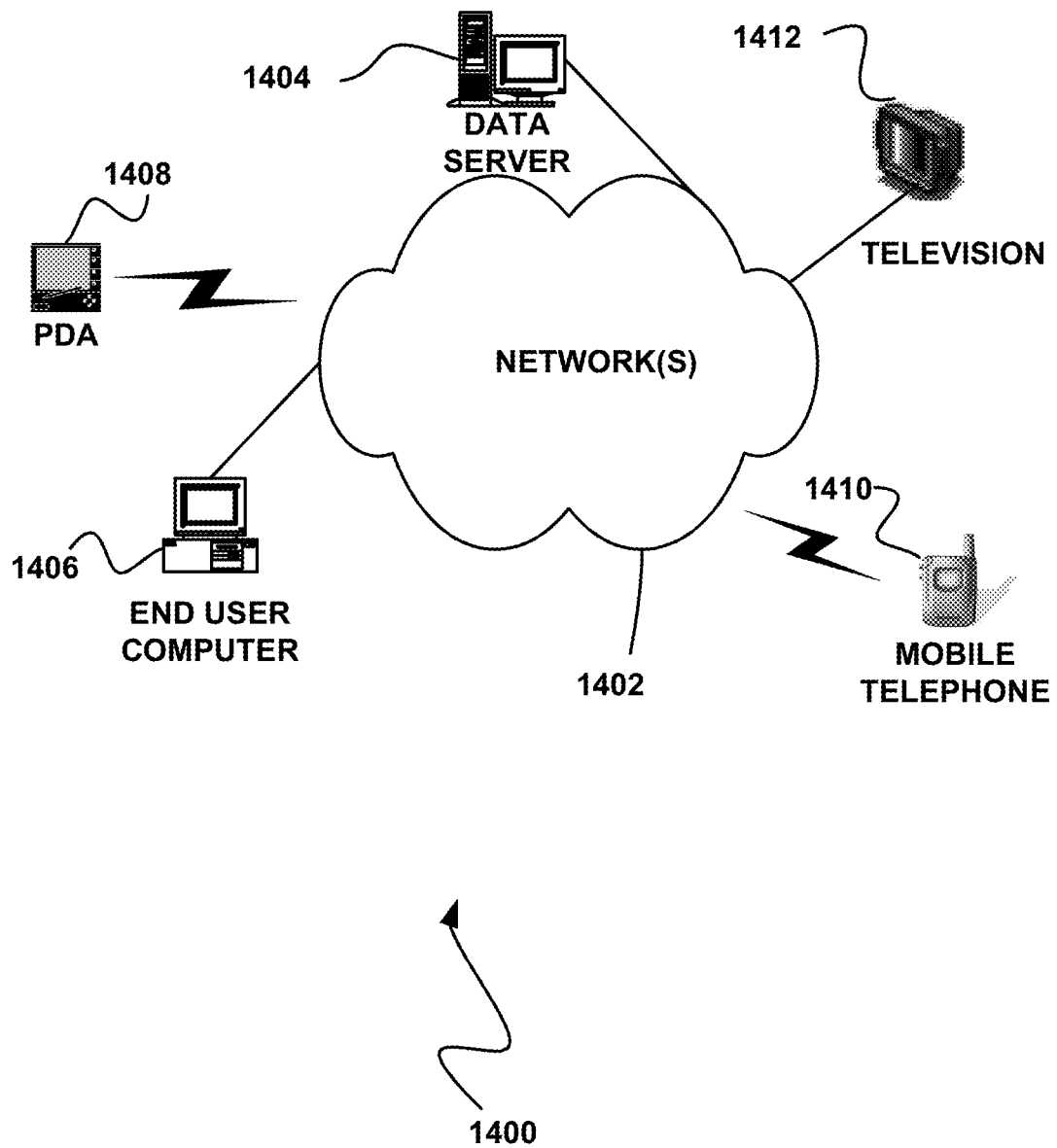
FIG. 14 illustrates a network architecture, in accordance with one possible embodiment.

FIG. 14 illustrates a network architecture 1400, in accordance with one possible embodiment. As shown, at least one network 1402 is provided. In the context of the present network architecture 1400, the network 1402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1402 may be provided.

Coupled to the network 1402 is a plurality of devices. For example, a server computer 1404 and an end-user computer 1406 may be coupled to the network 1402 for communication purposes. Such end-user computer 1406 may include a desktop computer, lap-top computer, and/or any other type of logic. Still yet, various other devices may be coupled to the network 1402 including a personal digital assistant (PDA) device 1408, a mobile phone device 1410, a television 1412, etc.

Figure 15:
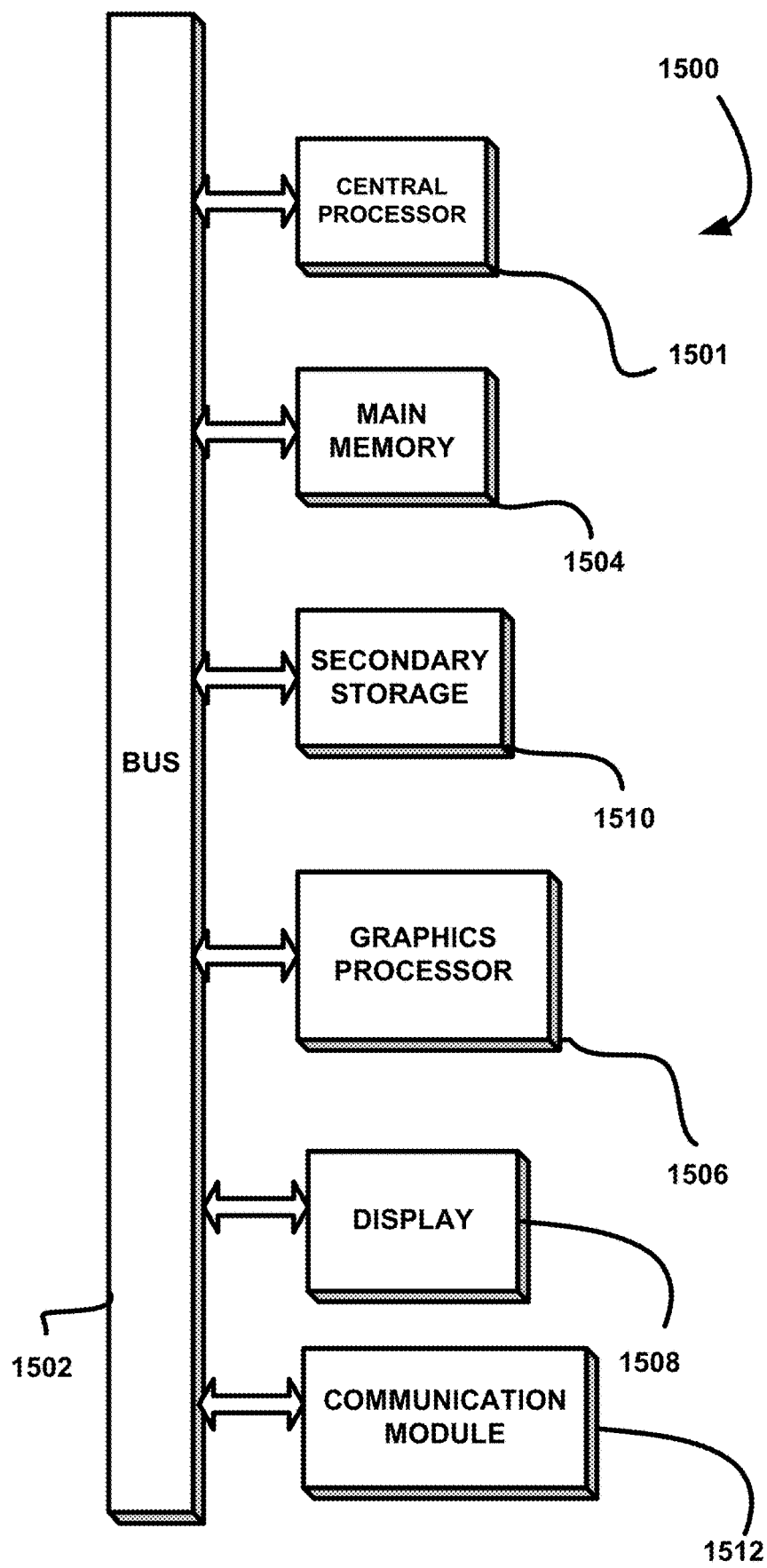
FIG. 15 illustrates an exemplary system, in accordance with one embodiment.

FIG. 15 illustrates an exemplary system 1500, in accordance with one embodiment. As an option, the system 1500 may be implemented in the context of any of the devices of the network architecture 1400 of FIG. 14. Of course, the system 1500 may be implemented in any desired environment.

As shown, a system 1500 is provided including at least one central processor 1501 which is connected to a communication bus 1502. The system 1500 also includes main memory 1504 [e.g. random access memory (RAM), etc.]. The system 1500 also includes a graphics processor 1506 and a display 1508.

The system 1500 may also include a secondary storage 1510. The secondary storage 1510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1504, the secondary storage 1510, and/or any other memory, for that matter. Such computer programs, when executed, enable the system 1500 to perform various functions (as set forth above, for example). Memory 1504, storage 1510 and/or any other storage are possible examples of non-transitory computer-readable media.

The system 1500 may also include one or more communication modules 1512. The communication module 1512 may be operable to facilitate communication between the system 1500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware.

Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a serving cell, an indication of poor coverage from user equipment (UE) during an active call;
   determining, by the serving cell, that coverage for the UE has become worse than a threshold value;
   determining, by the serving cell, to initiate an inter-Radio Access Technology (RAT) handover process responsive to determining that coverage for the UE has become worse than the threshold value;
   identifying, by the serving cell, a parameter indicating a conditional state in which selection between a measurement-based handover and a blind-based handover for the IRAT handover process is based on a critical condition threshold;
   responsive to identifying that the parameter indicates the conditional state, determining, by the serving cell, whether the critical condition threshold has been met by a Quality of Service (QoS) Class Identifier (QCI1);
   when the serving cell determines that the critical condition threshold has been met, performing, by the serving cell, a blind-based handover process including:
      evaluating a load condition of a target IRAT, and
      initiating the blind-based handover of the UE to the target IRAT based on the load condition;
   when the serving cell determines that the critical condition threshold has been met, performing, by the serving cell, a measurement-based handover process including:
      starting a timer during which UE context release commands to a Mobile Mobility Entity (MME) are deferred, and
      initiating a Single Radio Voice Call Continuity (SRVCC) procedure for the measurement-based handover.

2. The method of claim 1, wherein the parameter is capable of having a true state indicating that the blind-based handover should be used, a false state indicating that the measurement-based handover should be used, or the conditional state in which selection is made between the measurement-based handover and the blind-based handover should be used based on a critical condition threshold.

3. A computer program product embodied on a non-transitory computer readable medium, comprising computer code for:
   receiving, by a serving cell, an indication of poor coverage from user equipment (UE) during an active call;
   determining, by the serving cell, that coverage for the UE has become worse than a threshold value;

determining, by the serving cell, to initiate an inter-Radio Access Technology (RAT) handover process responsive to determining that coverage for the UE has become worse than the threshold value;

identifying, by the serving cell, a parameter indicating a conditional state in which selection between a measurement-based handover and a blind-based handover for the IRAT handover process is based on a critical condition threshold;

responsive to identifying that the parameter indicates the conditional state, determining, by the serving cell, whether the critical condition threshold has been met by a Quality of Service (QoS) Class Identifier (QCI1);

when the serving cell determines that the critical condition threshold has been met, performing, by the serving cell, a blind-based handover process including:
  evaluating a load condition of a target IRAT, and
  initiating the blind-based handover of the UE to the target IRAT based on the load condition;

when the serving cell determines that the critical condition threshold has been met, performing, by the serving cell, a measurement-based handover process including:
  starting a timer during which UE context release commands to a Mobile Mobility Entity (MME) are deferred, and
  initiating a Single Radio Voice Call Continuity (SRVCC) procedure for the measurement-based handover.

4. The computer program product of claim 3, wherein the parameter is capable of having a true state indicating that the blind-based handover should be used, a false state indicating that the measurement-based handover should be used, or the conditional state in which selection is made between the measurement-based handover and the blind-based handover should be used based on a critical condition threshold.

5. A serving cell system, comprising:
a memory for storing instructions; and
at least one processor that executes the instructions to perform a method comprising:
receiving, by the serving cell, an indication of poor coverage from user equipment (UE) during an active call;
determining, by the serving cell, that coverage for the UE has become worse than a threshold value;
determining, by the serving cell, to initiate an inter-Radio Access Technology (RAT) handover process responsive to determining that coverage for the UE has become worse than the threshold value;
identifying, by the serving cell, a parameter indicating a conditional state in which selection between a measurement-based handover and a blind-based handover for the IRAT handover process is based on a critical condition threshold;
responsive to identifying that the parameter indicates the conditional state, determining, by the serving cell, whether the critical condition threshold has been met by a Quality of Service (QoS) Class Identifier (QCI1);
when the serving cell determines that the critical condition threshold has been met, performing, by the serving cell, a blind-based handover process including:
  evaluating a load condition of a target RAT, and
  initiating the blind-based handover of the UE to the target IRAT based on the load condition;
when the serving cell determines that the critical condition threshold has been met, performing, by the serving cell, a measurement-based handover process including:
  starting a timer during which UE context release commands to a Mobile Mobility Entity (MME) are deferred, and
  initiating a Single Radio Voice Call Continuity (SRVCC) procedure for the measurement-based handover.

6. The system of claim 5, wherein the parameter is capable of having a true state indicating that the blind-based handover should be used, a false state indicating that the measurement-based handover should be used, or the conditional state in which selection is made between the measurement-based handover and the blind-based handover should be used based on a critical condition threshold.

7. The method of claim 1, wherein identifying the parameter indicating the conditional state includes:
checking the parameter to determine which of the following states is matched by a state of the parameter:
the conditional state,
a true state indicating that the blind-based handover is to be automatically used, and
a false state indicating that the measurement-based handover is to be automatically used.

* * * * *